No. 810,424. PATENTED JAN. 23, 1906.
T. S. MASON.
CALKING TOOL.
APPLICATION FILED APR. 20, 1905.
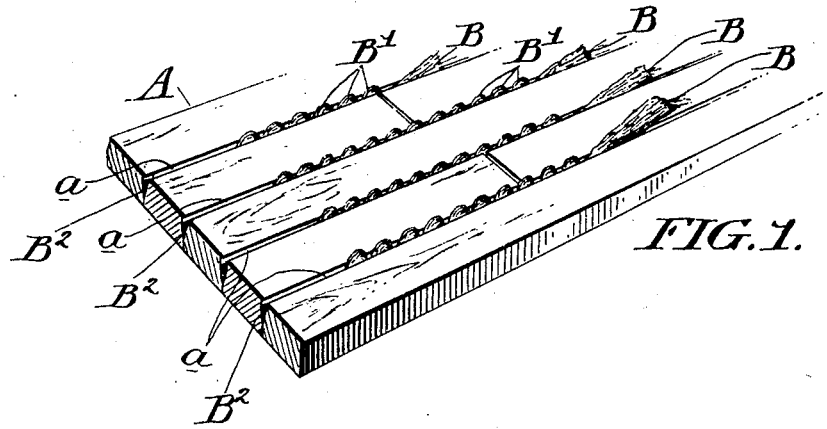
FIG. 1.
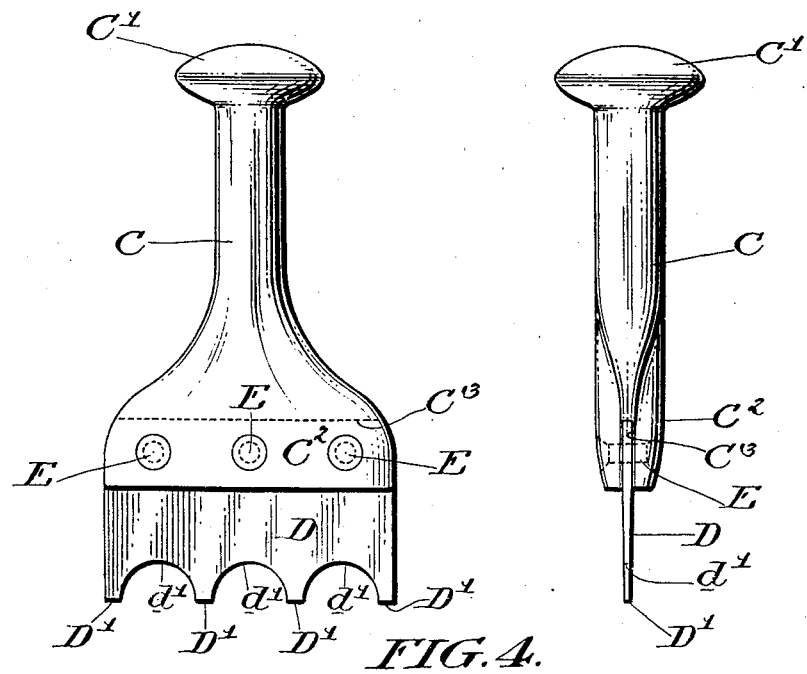
FIG. 2. FIG. 3.
FIG. 4.
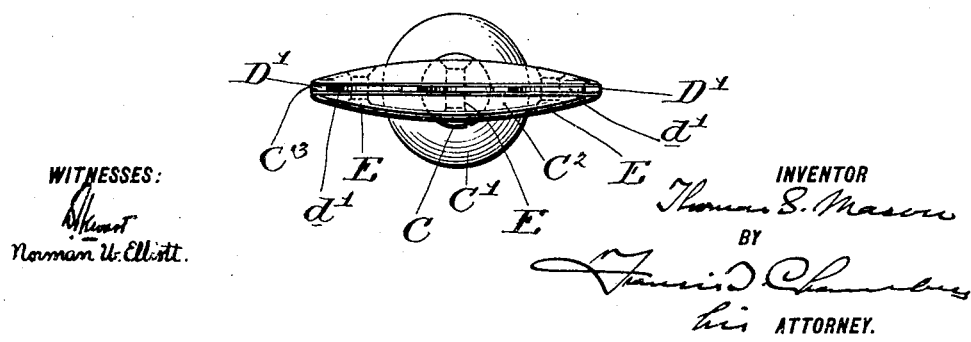
WITNESSES:
INVENTOR
Thomas S. Mason
BY
ATTORNEY.

UNITED STATES PATENT OFFICE.

THOMAS S. MASON, OF CAMDEN, NEW JERSEY, ASSIGNOR TO NEW YORK SHIPBUILDING COMPANY, OF CAMDEN, NEW JERSEY, A CORPORATION OF NEW JERSEY.

CALKING-TOOL.

No. 810,424.     Specification of Letters Patent.     Patented Jan. 23, 1906.

Application filed April 20, 1905. Serial No. 256,658.

*To all whom it may concern:*

Be it known that I, THOMAS S. MASON, a citizen of the United States of America, residing in the city and county of Camden, in the State of New Jersey, have invented a certain new and useful Improvement in Calking-Tools, of which the following is a true and exact description, reference being had to the accompanying drawings, which form a part thereof.

My invention relates to the construction of calking-tools, and has for its object to provide a tool adapted for the preliminary operation of pinning the oakum into the seam to be calked preparatory to the actual operation of calking by driving and compacting it into the seam; and my new tool consists, essentially, of a blade adapted to enter the seam and formed on its working edge with a series of blunt projections separated by recesses. This blade can of course be attached to any convenient handle; but I preferably use it in combination with a special shank and handle, as shown in the drawings.

In the drawings, Figure 1 is a perspective view of a portion of a ship's deck, showing the nature of the work to be done by my new tool. Fig. 2 is a side elevation of the tool; Fig. 3, an edge view thereof, and Fig. 4 a plan looking toward the working edge of the tool.

A is the deck to be calked; *a a*, &c., the seams.

B is the yarn of oakum which by the action of my tool is pinned into the seams *a*, as shown at B', while at B², I show the yarn packed or calked into the seams.

D is my calking-tool proper, formed of a steel blade, the working edge whereof is formed into a series of blunt projections D', separated by spaces *d'*.

C is the shank or handle for the tool, formed with a button-like head C' and with a broadened-out tool-holding portion C², slotted to receive the tool, as shown at *c³*, E E, &c., being rivets by which the blade is held to the shank.

In operation the oakum yarn is fed to the seam, as shown at B, and the operative then works along the seam with my tool, pinning the oakum to the seam, as shown at B', my new tool enabling the work to be done much more rapidly and evenly than has heretofore been found practicable and with the further result that the completed calked seam is better than when the preliminary pinning of the oakum in place has been effected by such tools as have heretofore been used.

Having now described my invention, what I claim as new, and desire to secure by Letters Patent, is—

1. A calking-tool having a blade adapted to enter the seam to be calked and formed with a series of blunt projections D', separated by recesses *d'*.

2. A calking-tool having a shank or handle C, provided with an expanded head C', and an elongated and slotted tool-holding portion C³, in combination with a blade D, inserted and secured in the slotted portion C³, and formed with a series of blunt projections D'.

THOMAS S. MASON.

Witnesses:
   B. FRANK FOX,
   S. G. WEIGAND.